United States Patent
Gupta (10) Patent No.: US 7,308,966 B2
(45) Date of Patent: Dec. 18, 2007

(54) DEVICE FOR REDUCING JET ENGINE EXHAUST NOISE USING OSCILLATING JETS

(75) Inventor: Anurag Gupta, Clifton Park, NY (US)

(73) Assignee: General Electric Company, Niskayuna, NY (US)

( * ) Notice: Subject to any disclaimer, the term of this patent is extended or adjusted under 35 U.S.C. 154(b) by 833 days.

(21) Appl. No.: 10/750,240

(22) Filed: Dec. 30, 2003

(65) Prior Publication Data

US 2005/0144935 A1 Jul. 7, 2005

(51) Int. Cl.
*F02K 1/30* (2006.01)
*F02K 1/34* (2006.01)
*B64C 23/06* (2006.01)
*B64D 33/04* (2006.01)
*F02K 1/10* (2006.01)
*F02K 1/38* (2006.01)
*B64B 1/24* (2006.01)

(52) U.S. Cl. ................ 181/215; 181/220; 181/221; 244/1 N; 244/53 B (58) Field of Classification Search ............ 181/215, 181/220, 221, 270, 213; 224/1 N, 53 B, 224/53 R, 204, 207
See application file for complete search history.

(56) References Cited

U.S. PATENT DOCUMENTS

| 2,943,821 | A | * | 7/1960 | Wetherbee, Jr. ............ 244/52 |
| 3,204,405 | A | * | 9/1965 | Bowles et al. .............. 60/231 |
| 3,294,323 | A | * | 12/1966 | Ernst ..................... 239/265.23 |
| 3,420,060 | A | * | 1/1969 | Toney et al. ................ 60/264 |
| 3,527,317 | A | * | 9/1970 | Motsinger .................. 181/206 |
| 3,826,331 | A | * | 7/1974 | Scharton et al. ............ 181/220 |
| 3,830,431 | A | * | 8/1974 | Schwartz ............... 239/265.11 |
| 4,474,259 | A | * | 10/1984 | Wright ...................... 181/220 |
| 5,092,425 | A |   | 3/1992 | Shaw, Jr. |
| 5,428,954 | A | * | 7/1995 | Cowan, Sr. ................. 60/262 |
| 5,490,545 | A | * | 2/1996 | Sokoloff et al. ............ 141/319 |
| 5,590,520 | A | * | 1/1997 | Papamoschou ............. 60/204 |
| 5,664,415 | A | * | 9/1997 | Terrier ....................... 60/204 |
| 5,916,127 | A | * | 6/1999 | Papamoschou ........... 60/226.1 |

(Continued)

FOREIGN PATENT DOCUMENTS

EP 1418331 5/2004

(Continued)

OTHER PUBLICATIONS

EP Search Report, EP04257993, Mar. 23, 2005.

(Continued)

*Primary Examiner*—Edgardo San Martin
(74) *Attorney, Agent, or Firm*—Penny A. Clarke; Patrick K. Patnode (57) ABSTRACT

A device for reducing engine exhaust noise in an aircraft engine includes a number of oscillating jets which direct an oscillating flow into the engine exhaust. The oscillating jets are connected via channels to a turbomachinery source of high pressure gas, where the source is located upstream from the engine exhaust portion. The high pressure gas passes through the oscillating jets, which have a nozzle with a triangular shaped orifice and an exhaust pipe, and exits the oscillating jets having a oscillating flow. The oscillating flow mixes with the engine exhaust thus reducing the noise created by the engine exhaust.

69 Claims, 6 Drawing Sheets

U.S. PATENT DOCUMENTS

| | | |
|---|---|---|
| 5,988,522 A | 11/1999 | Glezer et al. |
| 6,056,204 A | 5/2000 | Glezer et al. |
| 6,308,740 B1 * | 10/2001 | Smith et al. ............... 137/892 |
| 6,308,898 B1 | 10/2001 | Dorris, III et al. |
| 6,336,319 B1 * | 1/2002 | Koshoffer ................... 60/770 |
| 6,375,118 B1 | 4/2002 | Kibens et al. |
| 6,532,729 B2 | 3/2003 | Martens |
| 6,571,549 B1 | 6/2003 | Stanek |
| 6,655,632 B1 * | 12/2003 | Gupta et al. .............. 244/53 B |
| 7,086,498 B2 * | 8/2006 | Choi et al. ................. 181/270 |

FOREIGN PATENT DOCUMENTS

| | | |
|---|---|---|
| EP | 1493912 | 1/2005 |

OTHER PUBLICATIONS

S. K. Lee et al., "Preliminary Study of Oscillating Triangular Jets", 14th Australasian Fluid Mechanics Conference, Dec. 10-14, 2001.

P. Graziosi et al., "Fluidic Chevrons and Configurable Thermal Shield for Jet Noise Reduction", U.S. Appl. No. 10/610,718, field Jun. 30, 2003.

* cited by examiner

DEVICE FOR REDUCING JET ENGINE EXHAUST NOISE USING OSCILLATING JETS

BACKGROUND OF THE INVENTION

This invention relates to an apparatus for reducing jet engine exhaust noise, and more particularly to using oscillating jets to reduce jet engine exhaust noise.

The reduction of engine noise generated by jet aircraft engines is becoming an important aspect of jet engine design. This is true in both commercial and military applications, where the reduction of noise has obvious benefits. Additionally, the reduction of noise is beneficial to increasing the operational life of a jet engine and engine components because noise can contribute to the wear and sonic fatigue of engine components.

Various methods have been developed to decrease jet aircraft engine noise. However, these methods are not without their disadvantages. For example, chevrons and other geometric modifications have been employed in engine exhaust systems to enhance the mixing of the jet engine exhaust flow to reduce noise. However, these methods typically result in engine performance penalties, including thrust reduction and adverse effects on specific fuel consumption. These penalties are compounded by the fact that these mechanical devices require additional components and moving parts which add cost, weight and complexity to the engine. Further, many of these systems permanently exist in the engine exhaust system and cannot be turned off, or otherwise deactivated, when they are not needed.

Thus, fluidic devices that can be used in jet engine exhaust systems, which require no additional moving parts or complex systems, and can be turned off when noise suppression is not needed, are desirable.

SUMMARY OF THE INVENTION

In an embodiment, oscillating jets are placed at a trailing edge lip of a jet aircraft engine exhaust nozzle to enhance the mixing of jet engine exhaust. An oscillating jet, which can also be referred to as a flip-flop jet, is a passive system in the engine exhaust system. The oscillating jet has a nozzle with a triangular shaped orifice and an exhaust pipe, through which the stream of mixing gas passes. The oscillating jet introduces an oscillating stream of a gas into the engine exhaust. The oscillating stream of gas interacts with the jet engine exhaust shear layers and enhances the mixing of the engine exhaust shear layers. This mixing creates a fluidic chevron, which results in the overall reduction of the jet engine exhaust noise, while avoiding the need for a complex control system or a significant number of moving parts.

The oscillating stream of gas is created passively by using high pressure gas extracted from upstream turbomachinery equipment from the engine. The triangular orifice, in combination with the exhaust pipe, of the oscillating jet, creates flow instabilities that provides the oscillation to the stream of gas without the need of any extra power, or moving parts. The oscillating stream of gas is introduced into the engine exhaust gases near the exit of the engine exhaust gases from the exhaust nozzle of the engine.

BRIEF DESCRIPTION OF THE DRAWINGS

The advantages, nature and various additional features of the invention will appear more fully upon consideration of the illustrative embodiment of the invention which is schematically set forth in the figures, in which.

DETAILED DESCRIPTION OF THE INVENTION

The present invention will be explained in further detail by making reference to the accompanying drawings, which do not limit the scope of the invention in any way.

Figure 1:
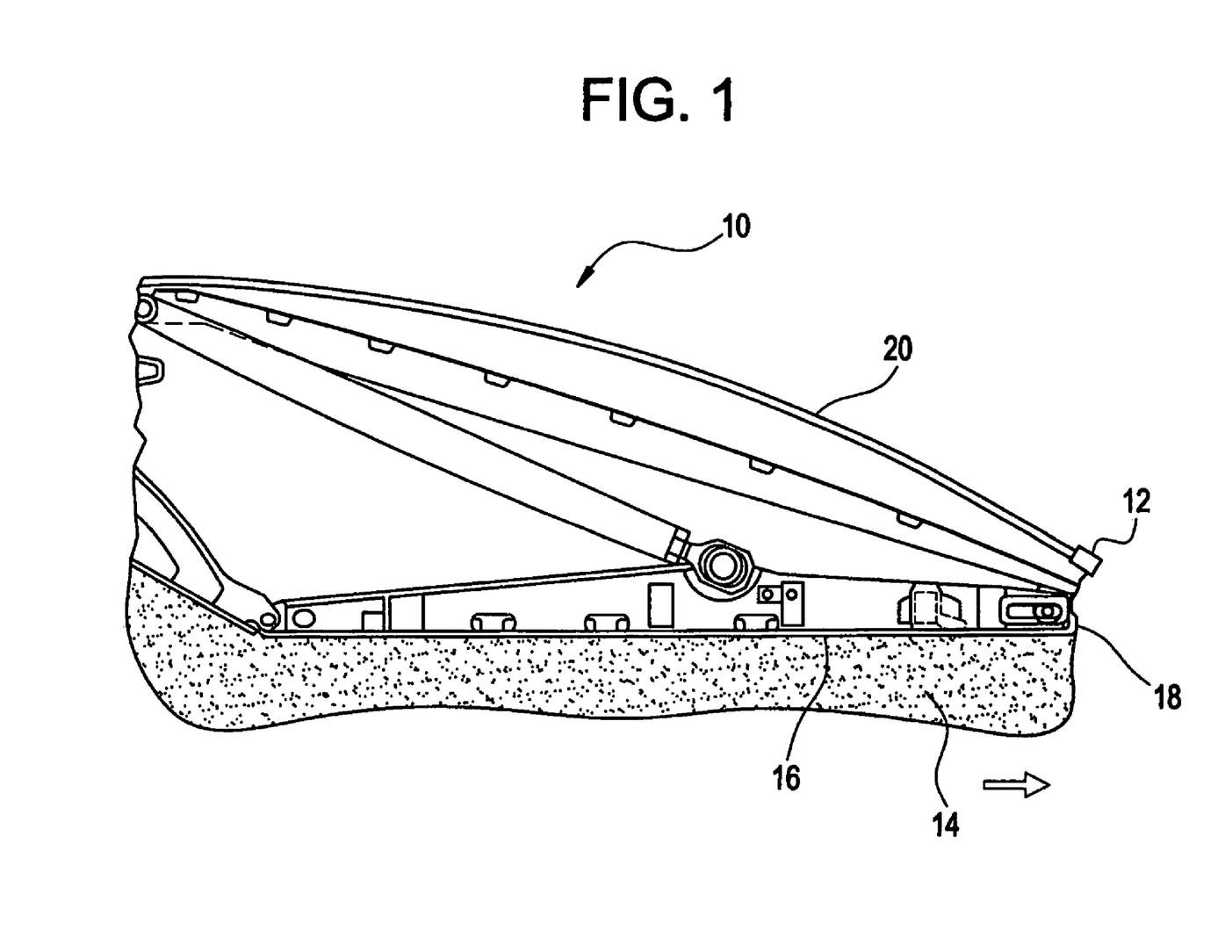
FIG. 1 is a diagrammatical representation of an exhaust portion of a jet aircraft engine with an oscillating jet positioned on the nozzle lip of the engine exhaust.
Figure 2:
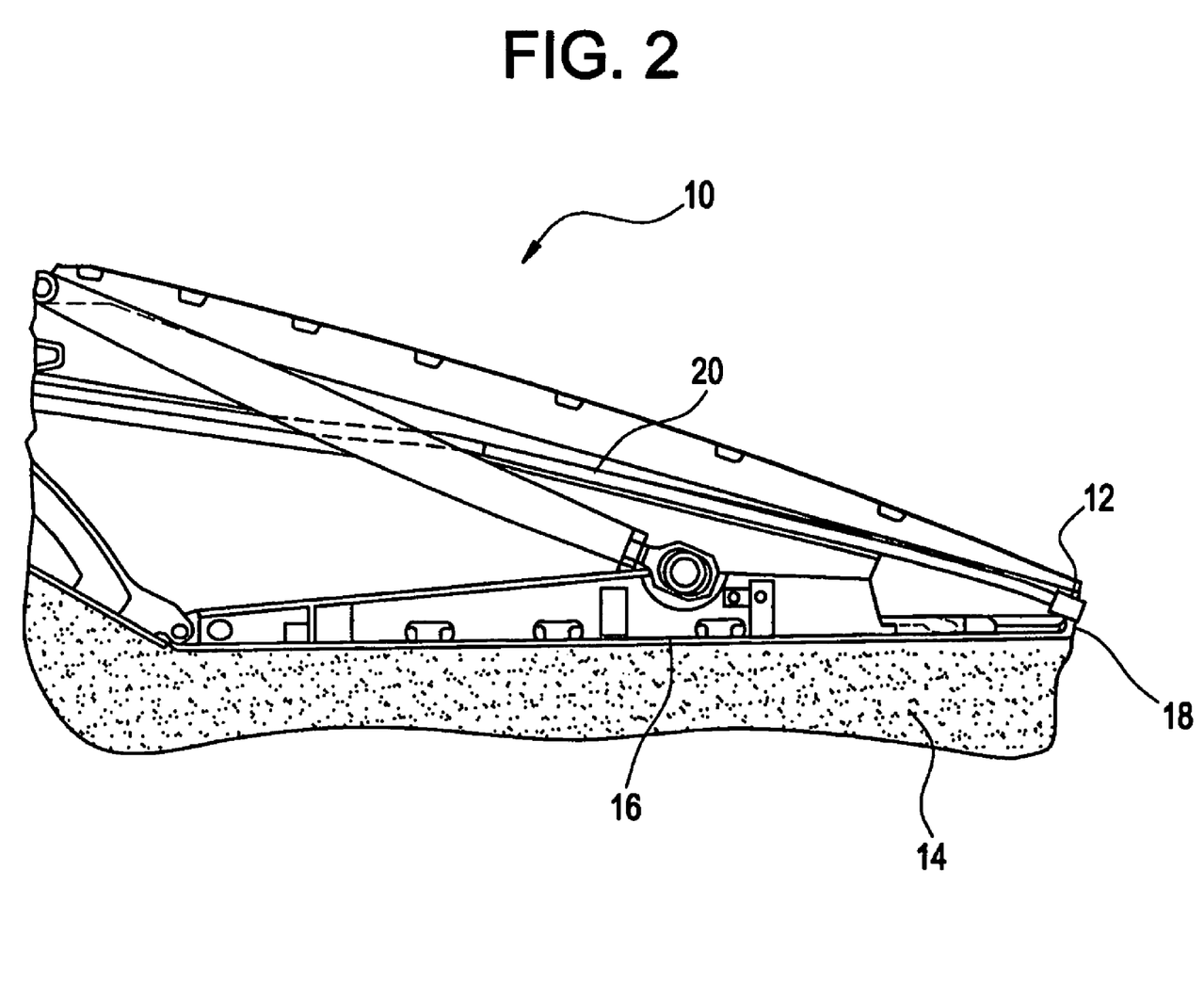
FIG. 2 is a diagrammatical representation of an exhaust portion of a jet aircraft engine with an oscillating jet positioned in the nozzle lip of the engine exhaust.
Figure 3:
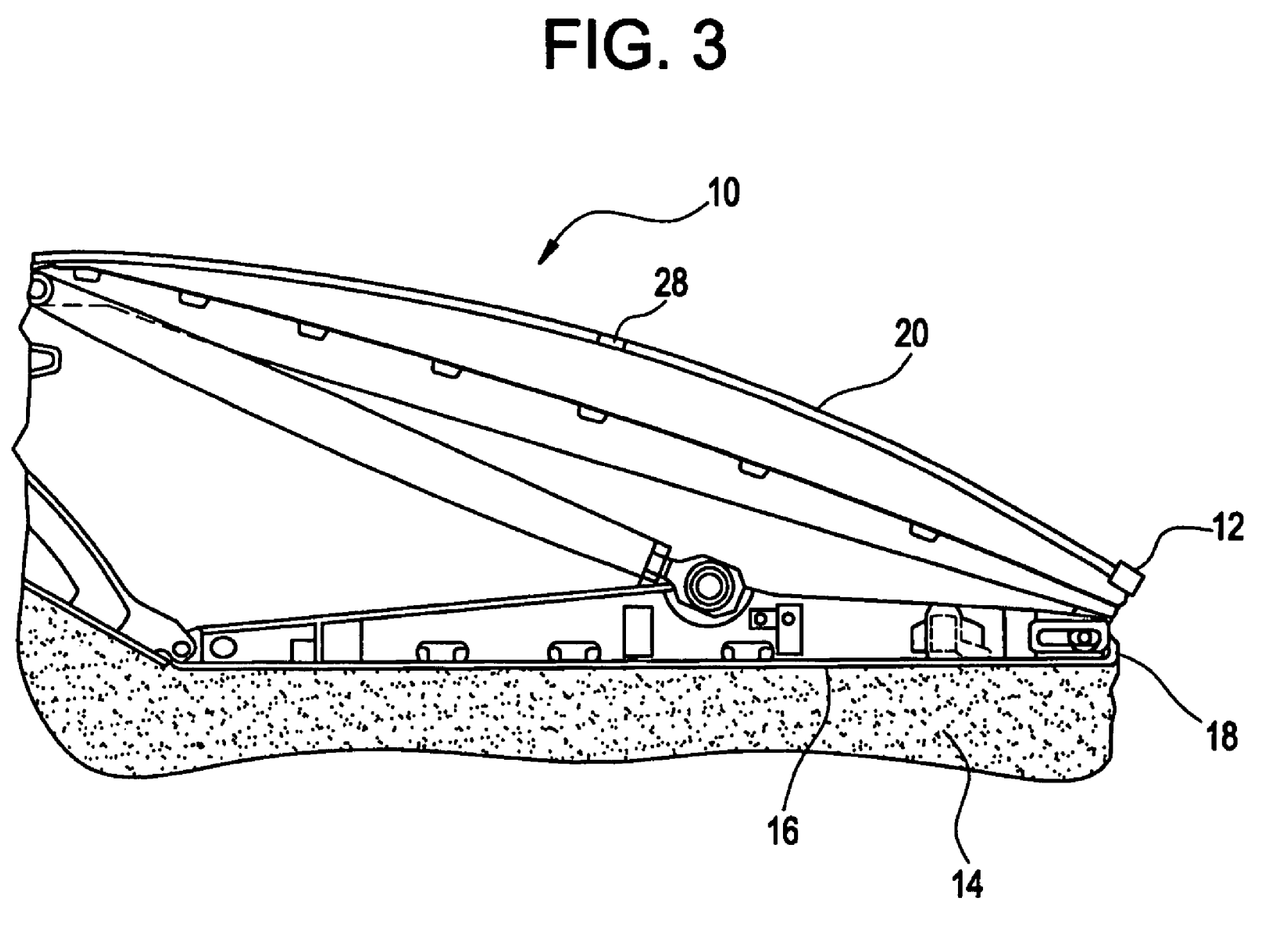
FIG. 3 is a diagrammatical representation of an exhaust portion of an engine with an oscillating jet similar to the one depicted in FIG. 1, having a flow control valve located upstream from the oscillating jet.
Figure 4:
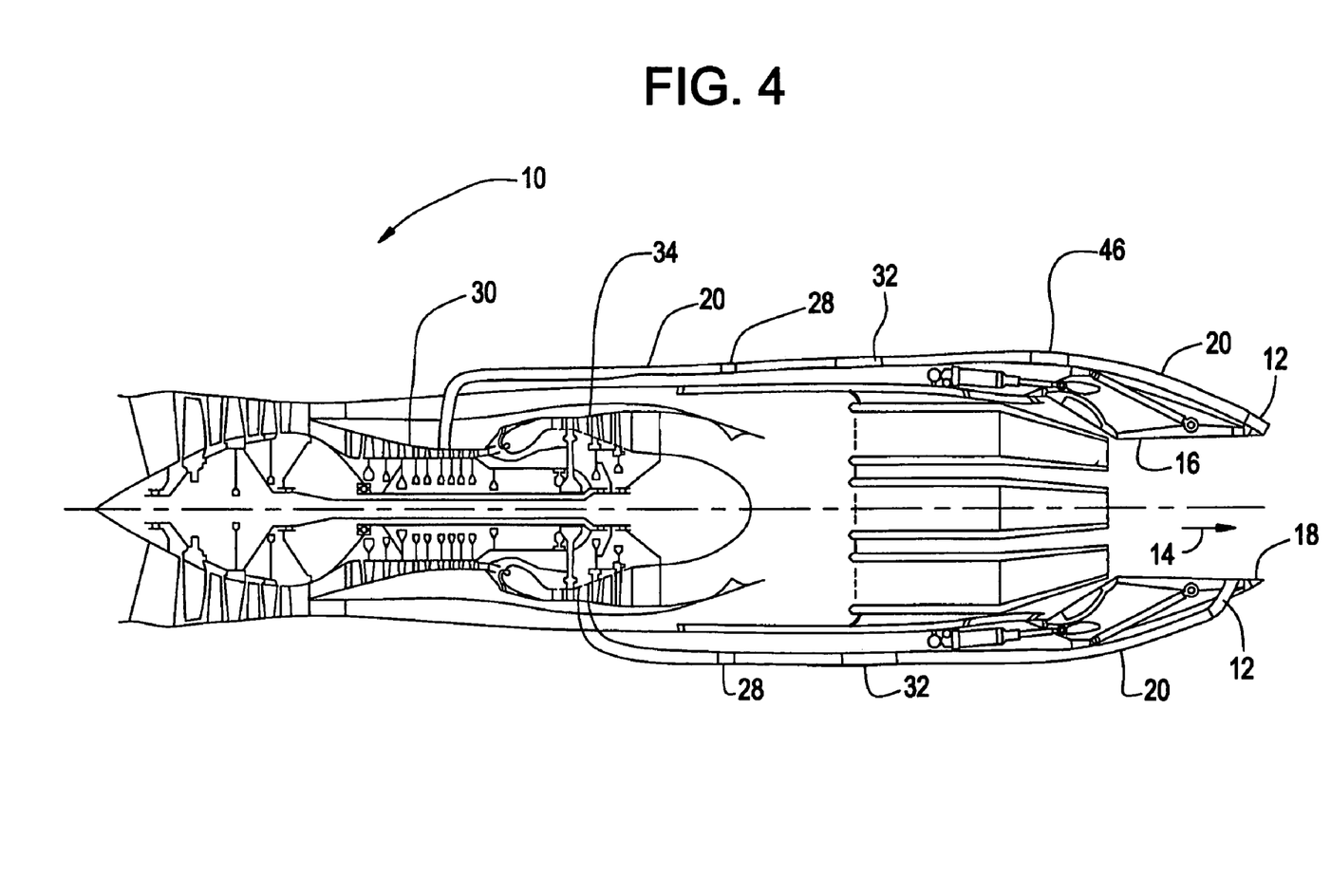
FIG. 4 is a diagrammatical representation of an aircraft jet engine equipped with oscillating jets.
Figure 5:
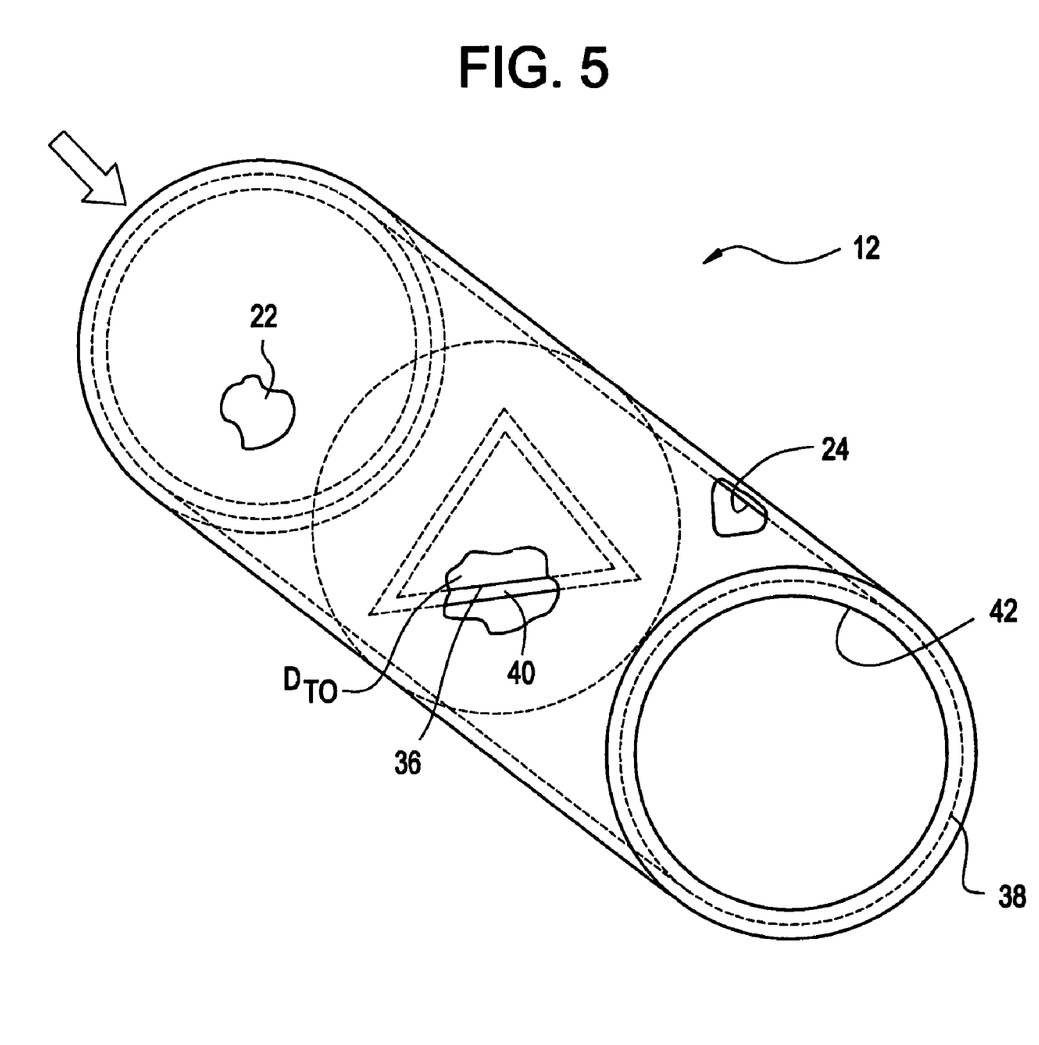
FIG. 5 is an diagrammatical representation of an asymmetric, cross-sectional view of an oscillating jet.
Figure 6:
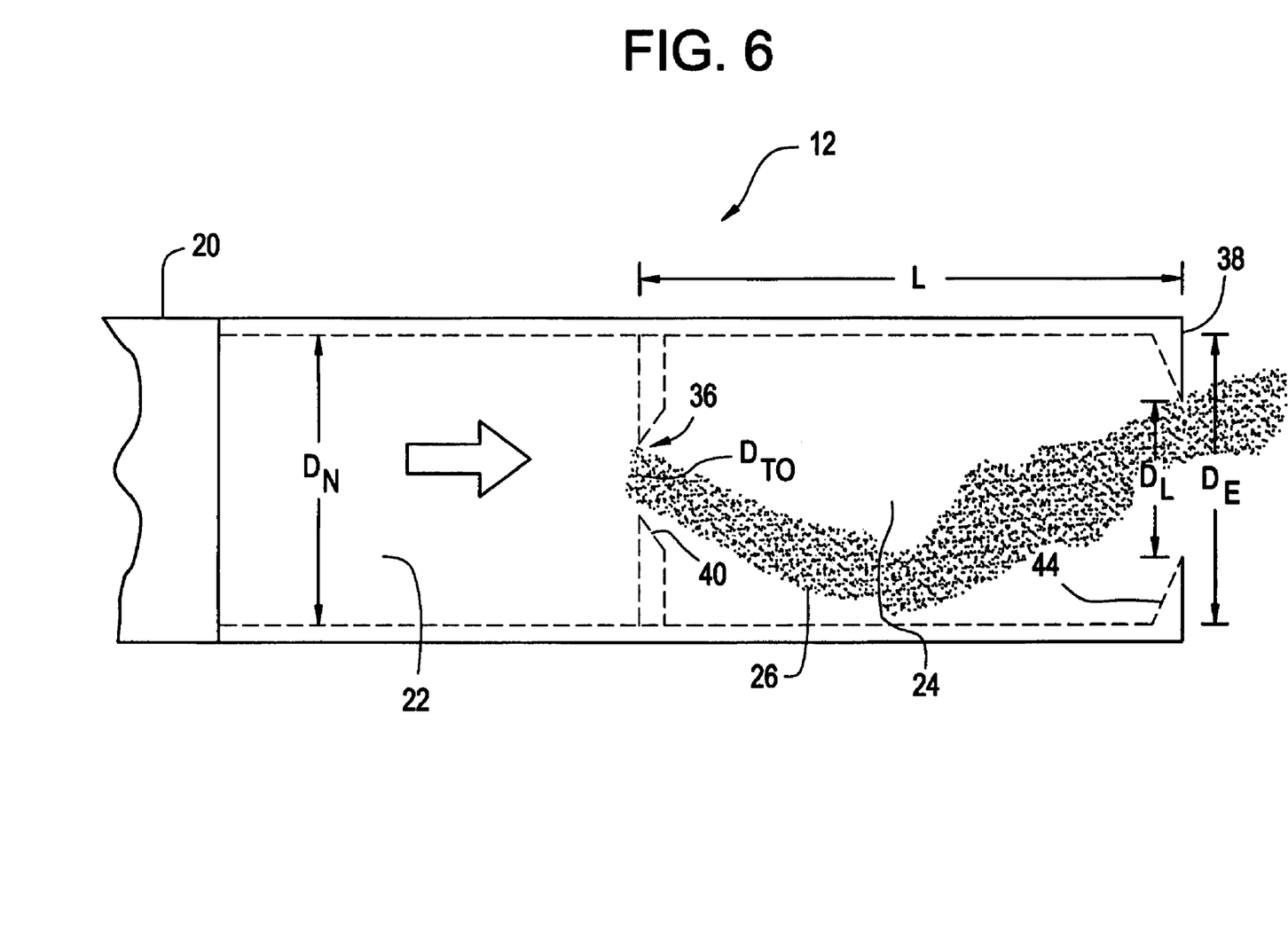
FIG. 6 is a diagrammatical representation of a lateral cross-section of an oscillating jet.

FIG. 1 is a cross-sectional side view of a portion of a jet aircraft engine 10 including an oscillating jet 12, positioned according to an embodiment of the invention. FIG. 2 is a cross-sectional side view of a portion of a jet aircraft engine 10 including an oscillating jet 12, positioned according to another embodiment of the invention. FIG. 3 is a cross-sectional side view of a portion of a jet aircraft engine 10, similar to that shown in FIG. 1, where a flow control valve is located upstream of the oscillating jet 12. FIG. 4 shows an aircraft engine 10 with an oscillating jet 12 positioned in the exhaust portion 16 of the engine 10. FIG. 5 is an asymmetric, cross-sectional view of an oscillating jet 12, and FIG. 6 is a lateral cross-sectional view of an oscillating jet 12.

In the jet aircraft engine 10, the jet engine exhaust gas 14 passes through the engine exhaust portion 16 in a direction indicated by the arrow, past an aft lip 18 of the jet engine exhaust portion 16. On an external surface of the jet engine exhaust portion 16 a number of oscillating jets 12 are positioned. It is noted that in FIGS. 1, 2 and 3 only a single jet 12 is shown for simplicity.

In one embodiment, the oscillating jets 12 are positioned symmetrically along the perimeter of the lip 18 of the jet engine exhaust portion 16. Other embodiments include positioning the oscillating jets asymmetrically with respect to the exhaust portion 16. The oscillating jets 12 are positioned to enhance mixing at peak noise locations in the engine portion 16. Additionally, the number of oscillating jets 12 employed vary according to the design requirements and limitations of the engine 10. The oscillating jets 12 can also be deployed in clusters with two (2) or more arranged to provide optimal mixing enhancement.

The oscillating jets 12 mounted on an exterior surface of the exhaust portion 16 are positioned at an angle in the range of about 120 degrees to about 0 degrees with respect to the flow direction of the exhaust gases 14. In one embodiment, the oscillating jets are positioned at an angle of about 30 degrees with respect to the flow direction of the exhaust gases 14. The angle chosen for the oscillating jets 12 optimizes mixing of the oscillating flow, exiting from the oscillating jets 12, with the engine exhaust gases 14 and shear layers to create a fluidic chevron.

Coupled to the oscillating jets 12 are channels 20 which direct the high pressure gas to the oscillating jets 12. In one embodiment, the high pressure gas is air. Other embodiments could include air seeded with other non-combustible or combustible materials (liquids and solids). The high pressure gas needed to power, or flow through, the oscillating jets 12 is extracted from turbomachinery components positioned upstream from the engine exhaust portion 16, in the engine 10. Alternately, high pressure gas can be provided by dedicated equipment employed for this purpose, if necessary.

The pressure of the high pressure gas is in the range of about 5 to about 500 PSI. In one embodiment, the pressure of the high pressure gas is about 50 PSI. The pressure of the high pressure gas is selected to ensure sustained oscillation of the gas flow as it exits the oscillating jets 12, to provide mixing with the engine exhaust gases 14.

In FIG. 2, a portion of an aircraft engine 10 is shown having an oscillating jet 12 positioned within the aft lip 18 of the engine exhaust portion 16. The channels 20 for the oscillating jets 12 are positioned within the structure of the exhaust portion 16.

In both FIGS. 1 and 2, the exit opening of the oscillating jet 12 is positioned such that the oscillating gas contacts, or begins mixing with, the engine exhaust gas 14 at a point aft of the aft lip 18 of the engine exhaust portion 16. However, in one embodiment the exit opening of the oscillating jet 12 is positioned upstream of the lip 18, such that the oscillating gas begins mixing with the exhaust gases 14 prior to the gases 14 exiting the engine 10. This is shown in FIG. 4. In one embodiment, a combination of the above positioning is used, where some of the oscillating jets 12 are located such that the oscillating gas mixes with the engine exhaust gases 14 aft of the engine lip 18, while other oscillating jets 12 are located such that they exhaust the oscillating gas forward of the engine lip 18.

FIG. 3 depicts a portion of an engine 10 similar to that shown in FIG.1. However, upstream of the oscillating jet 12, in the channel 20, a flow control valve 28 is positioned to control the flow of high pressure gas in the channel 20 to the oscillating jet 12. The flow control valve 28 controls any one of the flow pressure, flow rate, flow volume, or any combination thereof. This provides a diversity of control regarding the flow of the oscillating gas exiting from the oscillating jet 12, including permitting the flow to be stopped, if desired. The operation of the flow control valve 28 is manual or automatic, or both depending on the design requirements and specifications.

FIG. 4 shows an aircraft engine 10 with a number of oscillating jets 12 positioned on an outer surface of the exhaust portion 16 of the engine 10. The oscillating jets 12 are coupled to their respective channels 20. In the depiction, the upper channel 20 is coupled to a compressor stage 30, so as to provide high pressure air to the oscillating jet 12 from this stage of the engine 10. The lower channel 20 is coupled to a turbine stage 34, so as to provide high pressure air to the oscillating jet 12 from this stage of the engine 10. As shown, the lower oscillating jet 12 is positioned such that the oscillating gas mixes with the engine exhaust 14 upstream of the lip 18.

In one embodiment, both of the channels 20 are coupled to the same stage of the engine 10, so as to obtain the high pressure gas from the same engine stage. In another embodiment, the oscillating jets 12 are positioned in the exhaust portion 16 of the engine 10 at the same location, so as to have the oscillating streams from the jets 12 mix with the engine exhaust gases 14 at the same plane in the engine exhaust portion 16. Further, it is noted that although only two oscillating jets 12 are depicted in FIG. 4, in another embodiment there are more than two oscillating jets.

In yet another embodiment, the channels 20 are coupled to a bypass air portion of the engine (not depicted). Further, in an additional embodiment all of the oscillating jets 12 are coupled to the same source of high pressure gas through a single channel 20.

In each of the channels 20 a flow control valve 28 is provided to control the flow of high pressure gas to the oscillating jets 12. Additionally, in each of the channels 20 a flow stabilizer 32 is located to stabilize the high pressure gas and aid in providing a uniform flow to the oscillating jets 12. In an embodiment, the flow stabilizers 32 are removed. In another embodiment, the flow stabilizers 32 are located upstream from the flow control valves 28.

In another embodiment, a combustor or heat source 46 is located upstream of the oscillating jets 12 to increase the pressure and temperature of the gas prior to entering the oscillating jets 12.

Additionally, in another embodiment of the invention, a liquid spray is introduced into the gas prior to the gas exiting the jet 12. In one embodiment the liquid is water. However, in an alternative embodiment other liquids, including a combustible liquid, are used. The primary purpose of introducing these liquid sprays is to modify the mixing and oscillatory characteristics of the oscillating flow, such that they improve the mixing enhancement of the jet flow. Additionally, a combustible liquid can be used to provide additional thrust for the engine. As the gas and combustible liquid mixture exits the oscillating jets 12, the liquid comes in contact with the engine exhaust and is ignited. In either embodiment, the additional liquid can be added to the gas upstream of the jet 12 or within the structure of the jet 12. The addition of the liquid to the gas flowing through the nozzle 12 is to be such that the oscillation of the gas exiting the nozzle is not to be eliminated.

In a further embodiment, rather than a liquid, fine solid particles are added to the flow of gas. The solid particles are made of a solid propellant material and are injected into the gas flow either within the oscillating jet 12 or upstream of the jet 12. The size and amount of particles added to the gas flow is such that the oscillating flow of the gas as it exits the oscillating jet is not eliminated.

FIGS. 5 and 6 show an oscillating jet 12 having a nozzle 22 with a triangular shaped orifice 36 coupled to a cylindrically shaped exhaust pipe 24, from which the oscillating gas 26 exits. In one embodiment, the triangular shaped orifice 36 is an equilateral triangle. At the exit portion of the exhaust pipe 24, a lip 38 is provided having a smaller diameter opening $D_L$ than the diameter $D_E$ of the inner surface of the exhaust pipe 24. The opening in the lip 38 is circular and has a chamfered edge 44. Additionally, the triangular orifice 36 has a chamfered surface 40, to aid the flow of high pressure gas in separating at the upstream face of the orifice 36. In one embodiment, the diameter $D_L$ of the opening in the lip 38 is the same as the diameter $D_E$ of the inner surface exhaust pipe 24. In another embodiment, the diameter $D_L$ of the lip 38 is about 90% of the diameter $D_E$ of the exhaust pipe 24. Also, in an embodiment of the invention, the chamfer 40 of the triangular orifice is rounded, made square or beveled to optimize flow separation and to control instabilities.

The triangular orifice 36 has an effective diameter $D_{TO}$, which is equivalent to a diameter of a circle having the same area as the orifice 36. The nozzle 22 has an internal diameter $D_N$, and the exhaust pipe 24 has a length L from the upstream surface of the orifice 36 to the downstream surface of the lip 38. The ratio of the exhaust pipe diameter $D_E$ to the effective diameter $D_{TO}$ of the orifice is in the range of about two (2) to about five (5). The ratio of the length L of the exhaust pipe 24 to the diameter $D_E$ of the pipe 24 is in the range of about 1.5 to about four (4). Each of these ratios is optimized with respect to the operational parameters of the oscillating jets 12.

During operation, the high pressure gas from the channel 20 passes through the nozzle 22 and the triangular orifice 36 and enters the exhaust pipe 24. As the gas 26 exits the exhaust pipe 24, past the lip 38, it is oscillating, so as to maximize mixing of the high pressure gas 26 with the engine exhaust 14 and within the engine exhaust itself.

According to a particular embodiment, the length L and diameter $D_E$ of exhaust pipe 24 are selected to optimize the oscillation of the oscillating gas 26.

The nozzle 22, triangular orifice 36, exhaust pipe 24 and channel 20 are made from typical materials used in jet aircraft engines. According to a particular embodiment, the materials are optimized based on the operating conditions and environment of the jets 12. Further, these components are secured to each via welding, fasteners or other suitable methods capable of withstanding the engine 10 operating parameters and pressures. In one embodiment, at least the nozzle 22, orifice 36 and the cylinder 24 are made integrally with each other.

In another embodiment, the triangular orifice 36 is variable to provide optimization of oscillating flow at various stages and under various flight parameters. In an additional embodiment, the length L of the exhaust pipe 24 is adjustable to provide optimization of oscillating flow at various stages and under various flight parameters. In either embodiment, the variations or adjustments are made either manually or automatically to optimize the oscillating flow at various conditions.

While the invention has been described in terms of various specific embodiments, those skilled in the art will recognize that the invention can be practiced with modification within the spirit and scope of the claims.

What is clamed is:

1. A device for reducing jet engine exhaust noise, comprising:
    at least one oscillating jet coupled to an engine exhaust portion, said oscillating jet comprising:
        a nozzle with a triangular shaped orifice formed therein, and
        an exhaust pipe coupled to said nozzle,
        wherein a flow of gas passes through said triangular shaped orifice and exits from said exhaust pipe, having an oscillating flow, and
        wherein at least a portion of said gas from said exhaust pipe mixes with engine exhaust passing through said engine exhaust portion.

2. The device for reducing jet engine exhaust noise according to claim 1, wherein said gas is air.

3. The device for reducing jet engine exhaust noise according to claim 1, wherein said engine exhaust portion comprises a lip portion positioned adjacent to a point at which said engine exhaust exits said engine exhaust portion, and wherein said at least one oscillating jet is positioned proximate to said lip portion.

4. The device for reducing jet engine exhaust noise according to claim 3, wherein said at least oscillating jet is positioned within said lip portion.

5. The device for reducing jet engine exhaust noise according to claim 3, wherein said at least one oscillating jet is positioned on an outer surface of said lip portion.

6. The device for reducing jet engine exhaust noise according to claim 3, wherein said at least one oscillating jet is positioned such that said flow of gas enters said engine exhaust portion at a position upstream from said point at which said engine exhaust exits said engine exhaust portion.

7. The device for reducing jet engine exhaust noise according to claim 1, wherein said oscillating jet has an angle between about 0 and about 120 degrees with respect to a flow of said engine exhaust.

8. The device for reducing jet engine exhaust noise according to claim 1, wherein said oscillating jet has an angle of about 30 degrees with respect to a flow of said engine exhaust.

9. The device for reducing jet engine exhaust noise according to claim 1, wherein said triangular shaped orifice is variable.

10. The device for reducing jet engine exhaust noise according to claim 1, wherein said triangular shaped orifice is equilateral.

11. The device for reducing jet engine exhaust noise according to claim 1, wherein a length of said exhaust pipe is variable.

12. The device for reducing jet engine exhaust noise according to claim 1, wherein at least one channel couples said nozzle to a source of said gas, wherein said source is located upstream of said engine exhaust portion.

13. The device for reducing jet engine exhaust noise according to claim 12, wherein said source is at least one of an engine compressor, an engine turbine, and an engine bypass portion.

14. The device for reducing jet engine exhaust noise according to claim 12, further comprising a flow control valve for said gas positioned upstream of said nozzle in said channel.

15. The device for reducing jet engine exhaust noise according to claim 12, further comprising a flow stabilizer for said gas positioned upstream of said nozzle in said channel.

16. The device for reducing jet engine exhaust noise according to claim 12, wherein said source provides a flow of said gas with a pressure in the range of about 5 to about 500 PSI.

17. The device for reducing jet engine exhaust noise according to claim 12, wherein said source provides a flow of said gas with a pressure of about 50 PSI.

18. The device for reducing jet engine exhaust noise according to claim 1, wherein said exhaust pipe has a lip portion provided at an exit of said exhaust pipe, wherein said gas passes through a circular opening in said lip portion.

19. The device for reducing jet engine exhaust noise according to claim 18, wherein a diameter of said circular opening is about 90% of a diameter of said exhaust pipe.

20. The device for reducing jet engine exhaust noise according to claim 18, wherein said circular opening has a chamfered edge.

21. The device for reducing jet engine exhaust noise according to claim 1, wherein said triangular shaped orifice has a chamfered edge.

22. The device for reducing jet engine exhaust noise according to claim 21, wherein said chamfer is one of straight, rounded, beveled and squared.

23. The device for reducing jet engine exhaust noise according to claim 12, further comprising a heat source coupled to said channel to heat said gas prior to entering said nozzle.

24. The device for reducing jet engine exhaust noise according to claim 1, wherein a ratio of $L/D_E$ is in the range of about 1.5 to about 4, where L is a length of the exhaust pipe and $D_E$ is a diameter of the exhaust pipe.

25. The device for reducing jet engine exhaust noise according to claim 1, wherein a ratio of $D_E/D_{TO}$ is in the range of about 2 to about 5, where $D_E$ is a diameter of the exhaust pipe and $D_{TO}$ is a diameter of a circle having the same area as said triangular shaped orifice.

26. The device for reducing jet engine exhaust noise according to claim 1, further comprising a heat source to heat said gas prior to said gas exiting said exhaust pipe.

27. A device for reducing jet engine exhaust noise, comprising:
a plurality of oscillating jets coupled to an engine exhaust portion, each of said oscillating jets comprising:
a nozzle with a triangular shaped orifice formed therein, and
an exhaust pipe coupled to said nozzle,
wherein a flow of gas passes through said triangular shaped orifice and exits from said exhaust pipe, having an oscillating flow, and
wherein at least a portion of said gas from said exhaust pipe mixes with engine exhaust passing through said engine exhaust portion.

28. The device for reducing jet engine exhaust noise according to claim 27, wherein said plurality of oscillating jets are positioned symmetrically with respect to said engine exhaust portion.

29. The device for reducing jet engine exhaust noise according to claim 27, wherein said gas is air.

30. The device for reducing jet engine exhaust noise according to claim 27, wherein said engine exhaust portion comprises a lip portion positioned adjacent to a point at which said engine exhaust exits said engine exhaust portion, and wherein at least one of said oscillating jets is positioned proximate to said lip portion.

31. The device for reducing jet engine exhaust noise according to claim 30, wherein said at least one oscillating jet is positioned within said lip portion.

32. The device for reducing jet engine exhaust noise according to claim 30, wherein said at least one oscillating jet is positioned on an outer surface of said lip portion.

33. The device for reducing jet engine exhaust noise according to claim 30, wherein said at least one oscillating jet is positioned such that said flow of gas enters said engine exhaust portion at a position upstream from said point at which said engine exhaust exits said engine exhaust portion.

34. The device for reducing jet engine exhaust noise according to claim 27, wherein at least one of said oscillating jets has an angle between about 0 and about 120 degrees with respect to a flow of said engine exhaust.

35. The device for reducing jet engine exhaust noise according to claim 27, wherein at least one of said oscillating jets has an angle of about 30 degrees with respect to a flow of said engine exhaust.

36. The device for reducing jet engine exhaust noise according to claim 27, wherein in at least one of said oscillating jets said triangular shaped orifice is variable.

37. The device for reducing jet engine exhaust noise according to claim 27, wherein in at least one of said oscillating jets said triangular shaped orifice is equilateral.

38. The device for reducing jet engine exhaust noise according to claim 27, wherein in at least one of said oscillating jets a length of said exhaust pipe is variable.

39. The device for reducing jet engine exhaust noise according to claim 27, wherein said nozzle of each of said oscillating jets is coupled to a channel which couples each of said nozzles to a source of said gas, wherein said source is located upstream of said engine exhaust portion.

40. The device for reducing jet engine exhaust noise according to claim 39, wherein said source is at least one of an engine compressor, an engine turbine, and an engine bypass portion.

41. The device for reducing jet engine exhaust noise according to claim 27, wherein said nozzle of each of said oscillating jets is coupled to an individual channel, where each of said individual channels are coupled to a source of said gas through, wherein said source is located upstream of said engine exhaust portion.

42. The device for reducing jet engine exhaust noise according to claim 41, wherein said source is at least one of an engine compressor, an engine turbine, and an engine bypass portion.

43. The device for reducing jet engine exhaust noise according to claim 39, further comprising a flow control valve for said gas positioned upstream of said nozzle in said channel.

44. The device for reducing jet engine exhaust noise according to claim 41, further comprising a flow control valve for said gas positioned upstream of said nozzle in at least one of said channels.

45. The device for reducing jet engine exhaust noise according to claim 39, further comprising a flow stabilizer for said gas positioned upstream of said nozzle in said channel.

46. The device for reducing jet engine exhaust noise according to claim 41, further comprising a flow stabilizer for said gas positioned upstream of said nozzle in at least one of said channels.

47. The device for reducing jet engine exhaust noise according to claim 39, wherein said source provides a flow of said gas with a pressure in the range of about 5 to about 500 PSI.

48. The device for reducing jet engine exhaust noise according to claim 41, wherein said source provides a flow of said gas with a pressure in the range of about 5 to about 500 PSI.

49. The device for reducing jet engine exhaust noise according to claim 39, wherein said source provides a flow of said gas with a pressure of a about 50 PSI.

50. The device for reducing jet engine exhaust noise according to claim 41, wherein said source provides a flow of said gas with a pressure of 50 PSI.

51. The device for reducing jet engine exhaust noise according to claim 27, wherein said exhaust pipe of at least one of said oscillating jets has a lip portion provided at an exit of said exhaust pipe of said at least one oscillating jet, wherein said gas passes through a circular opening in said lip portion.

52. The device for reducing jet engine exhaust noise according to claim 51, wherein a diameter of said circular opening is about 90% of a diameter of said exhaust pipe of said at least one oscillating jet.

53. The device for reducing jet engine exhaust noise according to claim 52, wherein said circular opening has a chamfered edge.

54. The device for reducing jet engine exhaust noise according to claim 27, wherein said triangular shaped orifice of at least one of said oscillating jets has a chamfered edge.

55. The device for reducing jet engine exhaust noise according to claim 54, wherein said chamfer is one of straight, rounded, beveled and squared.

56. The device for reducing jet engine exhaust noise according to claim 27, further comprising a heat source coupled to said channel to heat said gas prior to entering said nozzle of at least one of said oscillating jets.

57. The device for reducing jet engine exhaust noise according to claim 27, wherein for at least one of said oscillating jets a ratio of $L/D_E$ is in the range of 1.5 to 4, where L is a length of the exhaust pipe and $D_E$ is a diameter of the exhaust pipe.

58. The device for reducing jet engine exhaust noise according to claim 27, wherein for at least one of said oscillating jets a ratio of $D_E/D_{TO}$ is in the range of about 2 to about 5, where $D_E$ is a diameter of the exhaust pipe and $D_{TO}$ is a diameter of a circle having the same area as said triangular shaped orifice.

59. The device for reducing jet engine exhaust noise according to claim 27, further comprising a heat source to heat said gas prior to said gas exiting said exhaust pipe from at least one of said oscillating jets.

60. A device for reducing jet engine exhaust noise, comprising:
  a plurality of oscillating jets coupled to an engine exhaust portion, each of said oscillating jets comprising:
    a nozzle with a equilateral triangular shaped orifice formed therein, and
    an exhaust pipe coupled to said nozzle, wherein said exhaust pipe has a lip portion provided at an exit of said exhaust pipe,
    wherein a flow of air passes through said triangular shaped orifice and exits from said exhaust pipe through a circular opening in said lip, having an oscillating flow, and
    wherein at least a portion of said air from said exhaust pipe mixes with engine exhaust passing through said engine exhaust portion.

61. A device for reducing jet engine exhaust noise, comprising:
  a plurality of channels coupled to at least one source of a gas; and
  a plurality of oscillating jets coupled to an engine exhaust portion and positioned symmetrically with respect to said engine exhaust portion, wherein each of said oscillating jets is coupled to one of said channels, each of said oscillating jets comprising:
    a nozzle with a equilateral triangular shaped orifice formed therein, said orifice having a chamfered edge, and
    an exhaust pipe coupled to said nozzle, wherein said exhaust pipe has a lip portion provided at an exit of said exhaust pipe and said lip portion has a circular opening having a diameter which is about 90% of a diameter of said exhaust pipe,
    wherein a flow of air passes through said triangular shaped orifice and exits from said exhaust pipe through said circular opening in said lip, having an oscillating flow, and at least a portion of said air from said exhaust pipe mixes with engine exhaust passing through said engine exhaust portion, and
  wherein at least one of said oscillating jets has a ratio of $L/D_E$ in the range of about 1.5 to about 4, and a ratio of $D_E/D_{TO}$ is in the range of about 2 to about 5, where L is a length of the exhaust pipe, $D_E$ is said diameter of the exhaust pipe, and $D_{TO}$ is a diameter of a circle having the same area as said triangular shaped orifice.

62. The device for reducing jet engine exhaust noise according to claim 60, wherein a liquid is inserted into said flow of gas prior to said gas exiting said circular opening.

63. The device for reducing jet engine exhaust noise according to claim 62, wherein said liquid is combustible.

64. The device for reducing jet engine exhaust noise according to claim 60, wherein solid particles are inserted into said flow of gas prior to said gas exiting said circular opening.

65. The device for reducing jet engine exhaust noise according to claim 64, wherein at least some of said particles are combustible.

66. The device for reducing jet engine exhaust noise according to claim 61, wherein a liquid is inserted into said flow of gas prior to said gas exiting said circular opening.

67. The device for reducing jet engine exhaust noise according to claim 66, wherein said liquid is combustible.

68. The device for reducing jet engine exhaust noise according to claim 61, wherein solid particles are inserted into said, flow of gas prior to said gas exiting said circular opening.

69. The device for reducing jet engine exhaust noise according to claim 68, wherein at least some of said particles are combustible.

* * * * *